United States Patent
Morin et al.

[11] Patent Number: 6,003,741
[45] Date of Patent: Dec. 21, 1999

[54] QUANTIZER AND DISPENSER OF PLANT-GROWERS' MATERIALS

[76] Inventors: Thomas M. Morin, 281 W. Mountain Rd.; David P. Morin, 15 Enterprise St., both of Adams, Mass. 01220

[21] Appl. No.: 09/164,555

[22] Filed: Oct. 1, 1998

[51] Int. Cl.⁶ ........................................ G01F 11/28
[52] U.S. Cl. ............................ 222/424.5; 141/65
[58] Field of Search ...................... 222/424.5, 175, 222/442, 444, 457; 111/77, 174, 177, 179, 180; 141/65; 47/58

[56] References Cited

U.S. PATENT DOCUMENTS

| | | | |
|---|---|---|---|
| 2,333,310 | 11/1943 | Greening | 222/424.5 X |
| 4,023,305 | 5/1977 | Harschel | 141/65 X |
| 4,182,385 | 1/1980 | Williamson | 141/65 |
| 5,111,854 | 5/1992 | Begley | 141/65 |
| 5,275,215 | 1/1994 | Derby | 141/65 X |

*Primary Examiner*—Gregory L. Huson

[57] ABSTRACT

A pipe shaped wand connected to a vacuum pump has at least one port, each port being covered by an air filter and having one end of a quantizing tube attached thereto. When the distal end of the quantizing tube end is held in a bed of fertilizer, insecticide or seed particles, and a vacuum is created, and air is withdrawn from the bed of fertilizer through the quantizing tube to fill the quantizing tube with and to hold the particles until the quantizer-dispenser is moved over a plug tray and the vacuum released to dispense the held quantity of particles into the tray. For automatic operation, a reservoir of particles is connected via a hose to the interior of the quantizing tube and a conventional check valve is connected to the distal end of the quantizing tube so that without moving the quantizer-dispenser each of a series of plug trays may be sequentially moved under the check valve, at which time a vacuum is created to close the check valve. The vacuum fills the quantizing tube(s) and when the vacuum is released, the check valve opens to dispense the held particles. The conventional check valve may be replaced by a length of flexible tube in which case the quantizer-dispenser is moved to bend the flexible tube against a table top to close it before a vacuum is created, and is then moved over a pot where dispensing occurs when the vacuum is released.

14 Claims, 4 Drawing Sheets

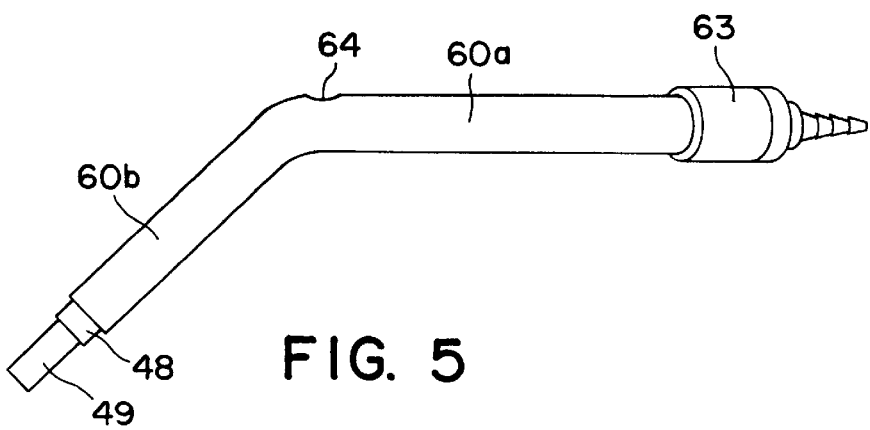
FIG. 5
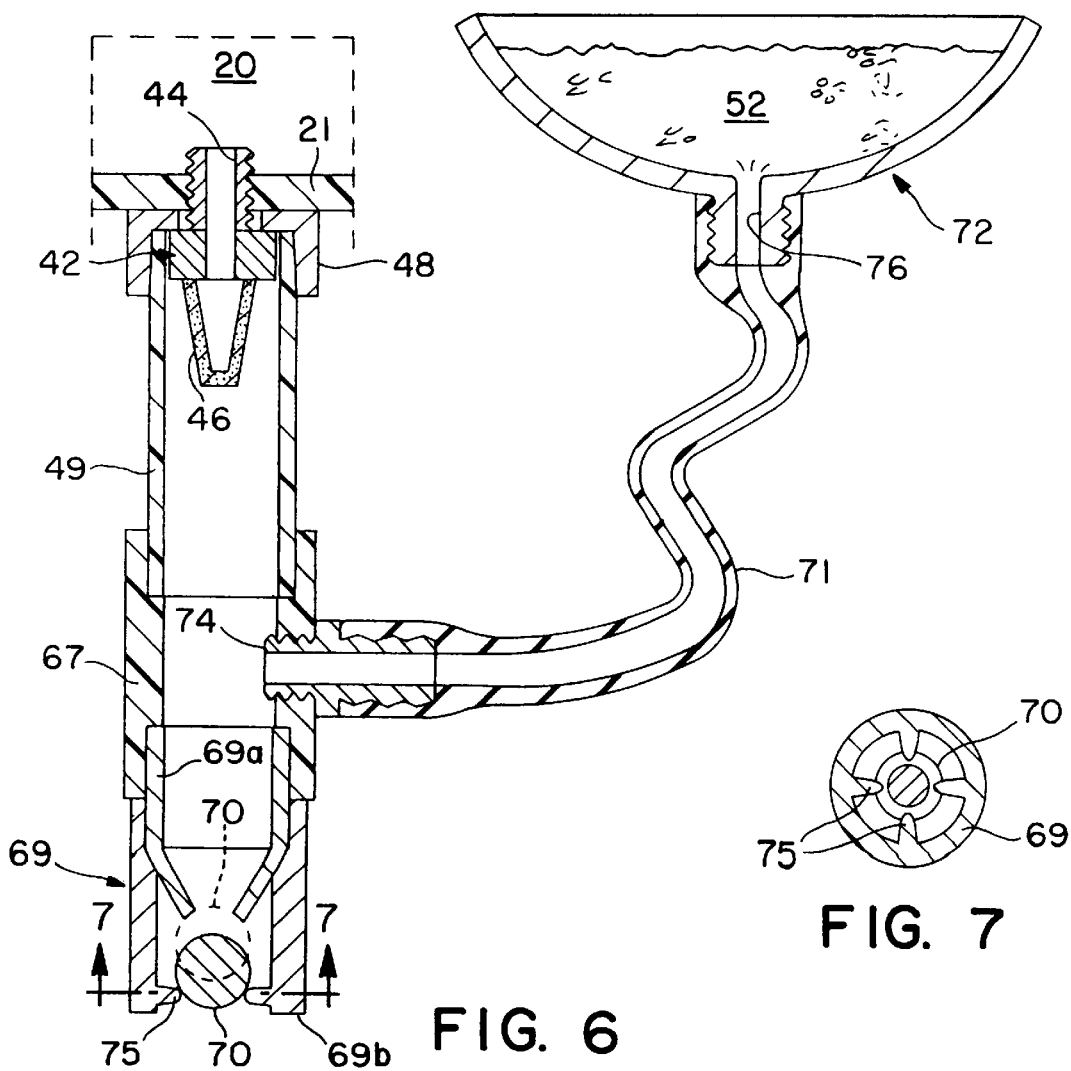
FIG. 6
FIG. 7

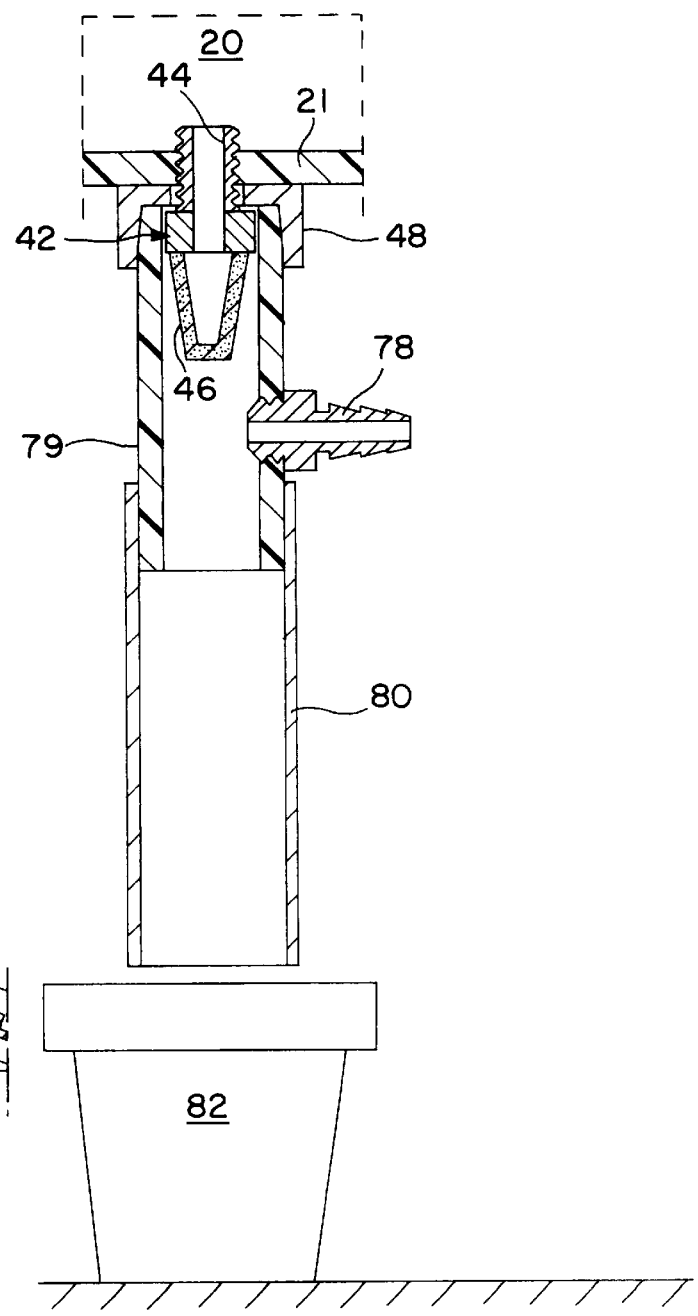

6,003,741

QUANTIZER AND DISPENSER OF PLANT-GROWERS' MATERIALS

BACKGROUND

This invention relates to a device for picking up a plurality of predetermined amounts of particles, such as seeds, finely pelletized fertilizer and dry pelletized insecticides and dispensing the quantized predetermined amounts of such growers' materials into a plurality of plant growers' plug trays.

BACKGROUND OF THE INVENTION

Typically commercial growers of flowers or vegetables begin by filling arrays of seedling trays, otherwise known as a plug trays, with a mixture of soil, fertilizer and insecticide and subsequently place one or more seeds in each tray.

There is described in the patent U.S. Pat. No. 5,414,955, issued May 16, 1995, a seeder that simultaneously picks up many individual seeds and simultaneously dispenses each one in a corresponding of regularly spaced apart seedling-tray pockets. A wand in the form of a pipe has a plurality of ports that are smaller than the seeds to be dispensed, so that when a vacuum is drawn at the interior of the wand and the wand momentarily laid on a bed of seeds, removal of the wand leaves one seed held to each port. The wand may then be placed adjacent to a row of plug trays, with each port registered over each tray, and when the vacuum is released, one seed drops into each tray.

In the patent U.S. Pat. No. 5,664,506, a hand held seed singulater and dispenser is shown which enables home growers and other small growers to sequentially dispense a single seed from a vibrating trough into each of a series of plug trays.

It is an object of the present invention to provide to growers of plants a quantizer and dispenser of seeds, and particles of fertilizer and/or insecticide into a growers' plug tray, or pot.

It is further object of this invention to provide such a quantizer and dispenser that dispenses a predetermined amount of such particles.

It is yet another object of this invention to provide such a quantizer and dispenser that dispenses a predetermined amount of growers' particles simultaneously into a plurality of plug trays.

SUMMARY OF THE INVENTION

A quantizer and dispenser of growers' material particles includes a hollow member having an inlet port and an outlet, an air filter covering the inlet port, a tube having a proximal end thereof sealed to the hollow member at the periphery of the port wherein the distal end of the tube is open. Thus when the distal tube end is held in a bed of particles, and a air is withdrawn from the hollow member through the outlet port, a vacuum is created in the hollow of the hollow member and the tube fills with and continues to hold the particles in the tube until the tube distal end is moved and registered over a plug tray and a subsequent release of the vacuum dispenses the held and predetermined quantity of particles into the tray.

The quantizer and dispenser may additionally include a cylindrical shaped entry union having one end connected to the distal end of the tube, and having a hose connector in one side of the entry union. A cylindrical check valve is then also included having an inlet end connected to the other end of the entry union, so that when a reservoir of growers' material particles is elevated above and connected by a feed hose to the entry-union hose connector, the creation of a vacuum in the hollow member causes the check valve to close and produces a stream of air through the reservoir of particles and through the feed hose and tube leading to the filling with particles of the tube and entry union and the holding there of the filling particles. Then when the vacuum is released the check valve opens and the held particles drop out of the tube and entry union through the check valve into a container that may be positioned beneath the check-valve dispensing end.

For simultaneously dispensing a predetermined quantity of growers' particles into a plurality of plug trays, there is disclosed a quantizer and dispenser that includes a wand in the form of an axially running elongated hollow member having a wall and having a plurality of ports in the wall of the elongated hollow member, and further includes a plurality of filters covering each of the ports in the elongated hollow-wand member. One of a plurality of tubes has a proximal end thereof sealed to the wand at the periphery of each one of the ports, the distal ends of the tubes being open.

Each of the filters is composed of a solid material in which a plurality of holes of about the same size are formed to filter and hold the particles from being sucked into the hollow of the wand when a vacuum is effected in the wand. Each of the filters is composed of a porous sintered metal that extends distally in the cavity of the tubes. The tubes are of the same length and the filters are of the same size, so that the amounts of the particles held in each of the tubes while the vacuum is present are essentially the same.

The ports are formed uniformly apart in a straight line in the wall of the hollow wand. A means for the sealing includes a plurality of cups each having a bottom with a hole registered with one of the ports. Each cup bottom is mounted and sealed to the periphery of one of the ports, the cups being adapted for having the proximal ends of the tubes press fitted therein to effect a seal with the wand at the periphery of the each port.

It is preferable that initially the plug trays be partially filled with potting soil so that the fertilizer or insecticide or seeds is dispensed on top of the potting soil. This top coating of soluble materials is greatly preferred to the conventional mixing of the particles with the potting soil, because subsequent watering causes dissolution of the particles at the top soil surface where newly sprouting seeds need it the most, and all of the soluble material being initially at the top surface subsequently dissolves and moves downward through the soil more nearly in step with the roots of the growing plant. The dispenser quantizer of this invention makes this practicable.

BRIEF DESCRIPTION OF THE DRAWINGS

FIG. 5 shows in perspective view another preferred particles quantizer-dispenser wand of this invention.

FIG. 6 shows in cross-sectional view additional structure that may be combined with any one of the above illustrated embodiments, e.g. the embodiment of FIG. 1 of this invention, for the purpose of simplifying automation of quantizing and dispensing, i.e. eliminating the need to move the quantizer-dispensers between a reservoir of particles and the trays into which they will be dispensed.

FIG. 7 shows the end-view section A—A of the check valve in FIG. 6.

FIG. 8 shows in cross-sectional view the wand of FIG. 1 wherein the quantizing tube 49 is replaced by a heavier one 79, and there is added thereto a flexible tube check valve 80.

FIG. 9 shows in cross-sectional view a distal-end portion of the check valve tube 80 of FIG. 8 wherein the wand has been moved to press the distal check-valve tube end closed against a table top.

DESCRIPTION OF THE PREFERRED EMBODIMENTS

Figure 1:
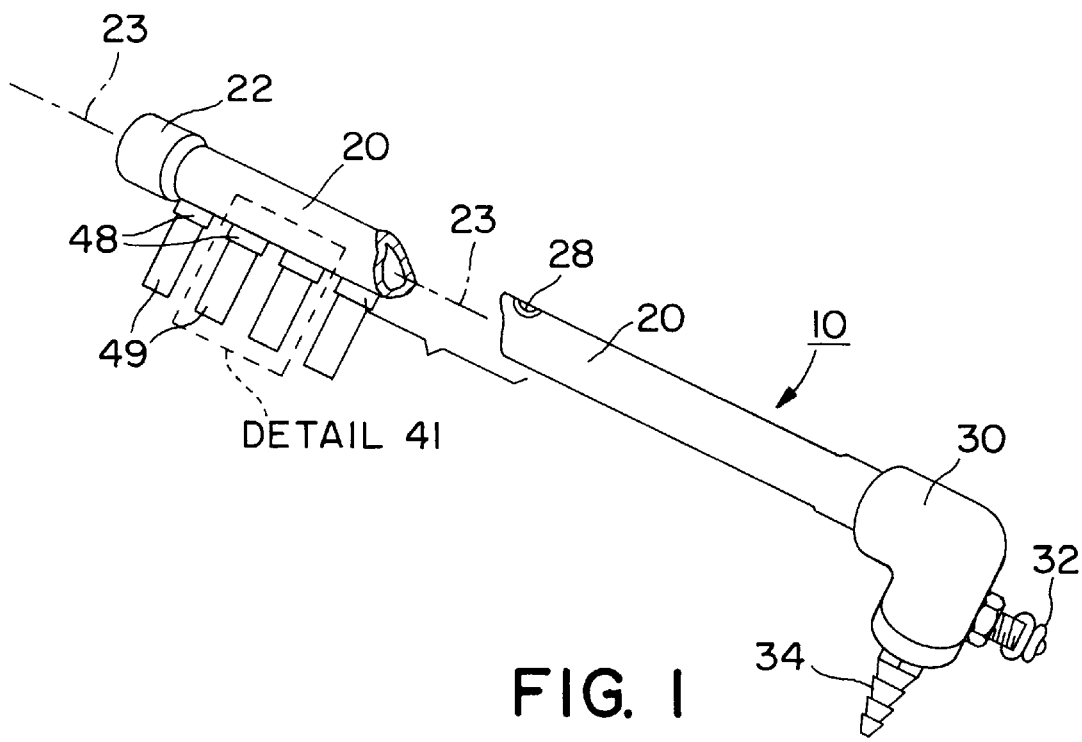
FIG. 1 shows in perspective view a first preferred particles quantizer-dispenser wand of this invention.

A quantizer-dispenser wand 10 of FIG. 1 includes an axially running elongated member or pipe 20 that is sealed at a distal end by a closure member 22. The axis 23 of pipe 20 runs concentric within it. Pipe 20 has a plurality of ports 24 in the wall of the pipe toward the distal end thereof. Ports 24 are spaced uniformly apart in a straight row in the wall 21 of the hollow-wand member, the straight row being parallel with the pipe axis 23.

To the proximal end of wand 10 is fitted an elbow 30 having an outlet connector 34 onto which a vacuum hose (not shown) may be fitted and clamped. A vacuum pump (not shown) would normally be connected to the vacuum hose. Elbow 30 also includes a valve 32 that can be used by the wand user to manually adjust a leakage of ambient air and thus the degree of vacuum (negative pressure) within the hollow of pipe 20.

Figure 2:
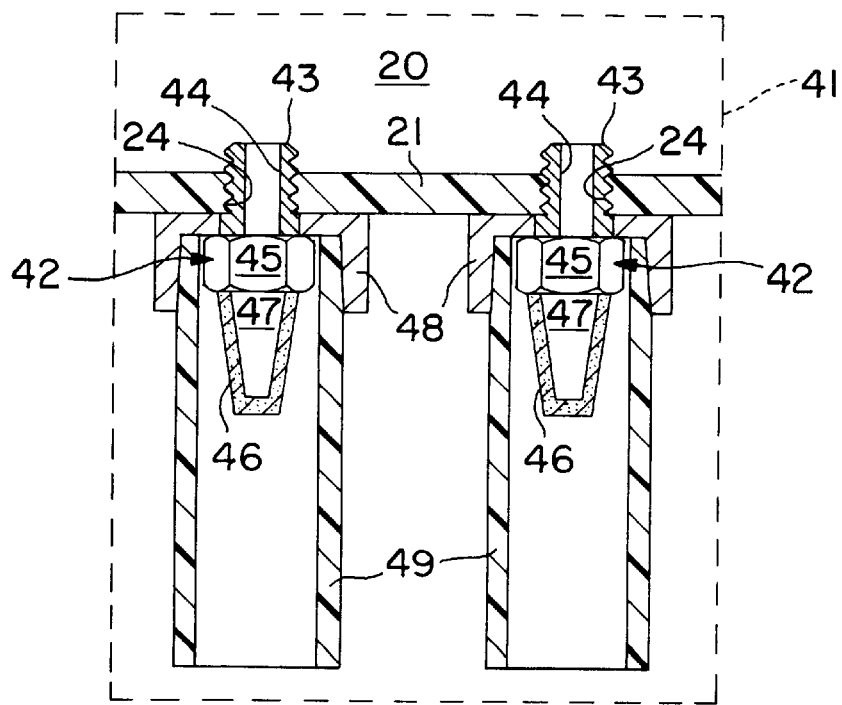
FIG. 2 shows in cross-sectional view an enlarged detail portion 41 of the quantizer-dispenser of FIG. 1.

In FIG. 2 the enlarged detail portion 41, of the quantizer-dispenser of FIG. 1, shows two adjacent threaded ports 24 in the wall 21 of pipe 20. In each port 24 there is mounted a filter assembly 42 having a threaded tubular portion 43 with a hole 44, a hex portion 45, and a filter portion 46. Only the hex portions 45 are fully shown and not sectioned in FIG. 2. The tubular (43) and hex (45) portions are one integral piece of metal while the filter portion 46 is of sintered porous metal taking the form of a porous wall in the shape of a truncated cone. The base of the conical filter walls is fused or otherwise bonded to the hex portion 46.

In an experimental model of the quantizer-dispenser of this invention, the filter assembly 42 is part number 445 OK31 in a Mc Master-Carr catalog, New Brunswick, N.J. the threaded tubular portion 43 is pipe size #10-32 and the hole extending through it to the inner recess 47 of the conical filter portion 46 has a diameter of $^{45}/_{64}$ inches (17.8 mm). Filters of this type are known as exhaust mufflers manufactured in many sizes for use as acoustic filters for mounting in the exhaust manifold of compressors to reduce the level of ambient compresses noise.

An inverted cup-shaped member 48 with a hole in the cup bottom is mounted to the pipe wall 21 over each port 24, by inserting the tubular portion 43 of the filter assembly 42 into a threaded port 24 and screwing the assembly 42 into the matching threads of the port 24. A vacuum drawn in the hollow of wand 10 causes a stream of ambient air to flow through the filter into the wand.

One end of polyethylene plastic tubing 49 is force fitted into the inverted cup-shaped member 48. The member 48 is slightly tapered so that the initial insertion of tubing 49 into member 48 is readily accomplished, and a force fit between them results in an effective seal.

A seal is thus provided between the threaded periphery of port 24 in wand wall 21 and assembly 42, between the hex portion 45 of filter assembly 42 to the bottom of cup-shaped member 48, and between the cup-shaped member 48 and the proximal end of quantizing tube 49. Thus the proximal end of a quantizing tube 49 is mounted to and sealed to the wand 10 at the periphery of each one of the ports 24.

The above noted structure for providing connection of a quantizing tube 49 to a member 48 is especially versatile, in that tubes of different lengths may readily be used as needed by a grower for different quantizing and dispensing tasks. Also the filter assembly 42 is mounted by being screwed into the threaded ports 24 of the wand 10, and can be easily screwed out for cleaning of the filters 46.

For example, tubes 49a (not shown) may be of metal with the proximal ends threaded into cup members 48a (not shown). A further alternative structure may include tubes 49b (not shown) each having a filter 46b (not shown) mounted within the proximal end of thereof. In this case the outer proximal ends of tubes 49b may be threaded into enlarged ports 24b (not shown) in the wall of the sand pipe 20b (not shown).

A control hole 28 through the wand wall 21 is located on pipe 20 beyond the plurality of ports 24 toward the proximal pipe end, so as to enable the wand operator to place a thumb over the control hole for maintaining a vacuum in pipe 20 and to remove the thumb to release the vacuum.

Any factor which affects the rate of flow of air through a tube (e.g. 49) and filter (e.g. 46) will affect the maximum amount of growers' material that can be sucked up and held before dispensing. For example, greater air flow rates will result from lower vacuum pressure in the wand, increased filter area or increased filter porosity.

Operation of the quantizer-dispenser wand of this invention is accomplished as follows. A bed of particles to be quantized and dispensed is prepared. Particles 52 may be tiny timed-release pellets of plant fertilizer or insecticide. The particles 52 may be seeds when it is desired to place a plurality of seeds in each of a multiplicity of growers' plug trays. A number of pieces of tubing 49 having essentially the same length are each inserted into one of the cup-shaped members 48. A vacuum is established in the hollow of wand 10 and the wand is held horizontally over the bed 52a of particles 52 with the distal ends of the pieces of tubing 49 lowered into the particles 52 to suck up and fill the pieces of tubing 49 with particles 52.

The wand is then positioned with the distal ends of the tubing pieces 49 in alignment over each of a number of plug trays in a row. The vacuum is released to drop and dispense simultaneously the quantity of seeds held by the vacuum in each piece of tubing into the corresponding plug tray beneath.

Figure 3:
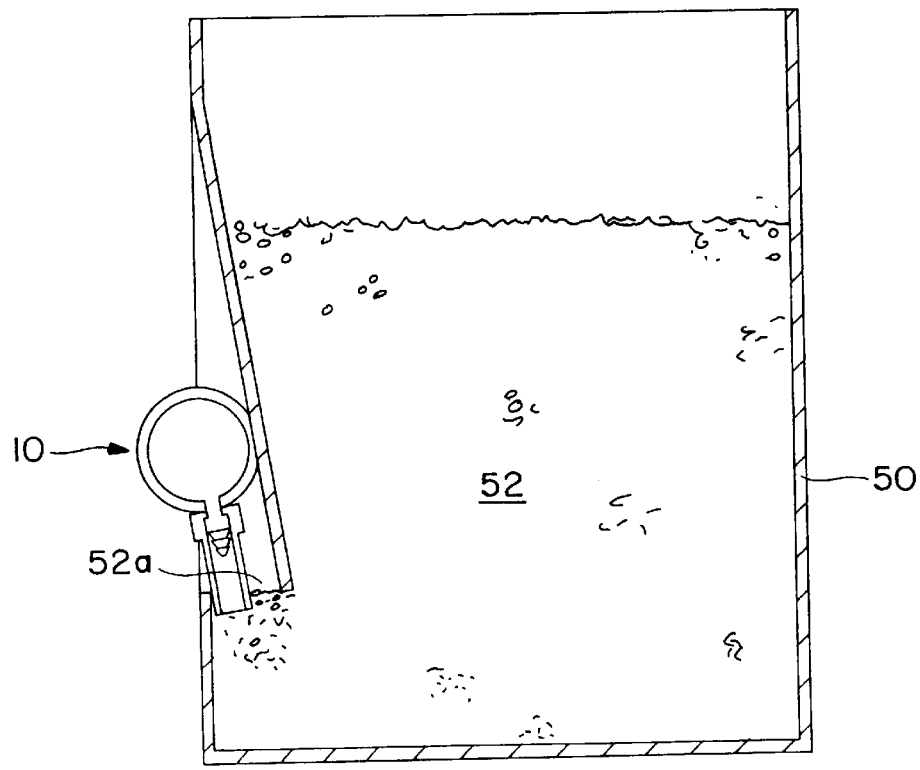
FIG. 3 shows in cross-sectional view a growers' materials bin.

When the wand of this invention is to be employed in a semi-automated machine for quantizing and dispensing growers' particles and for automatically repeatedly moving the quantizer-dispenser between a particles reservoir and a series of plug trays, a materials reservoir or bin 50 as seen in FIG. 3 advantageously provides a self leveling bed 52a of material particles 52.

The above-mentioned experimental wand constructed as illustrated in FIG. 1 proved capable of quantizing and dispensing fertilizer particles in amounts of 1.5 grams to an accuracy of 0.1 gram, which corresponds to a tolerance of better than +/−7%, and larger quantities using tubes (49) of greater capacity is expected to provide a commensurate increase in quantizing accuracy of this system.

Figure 4:
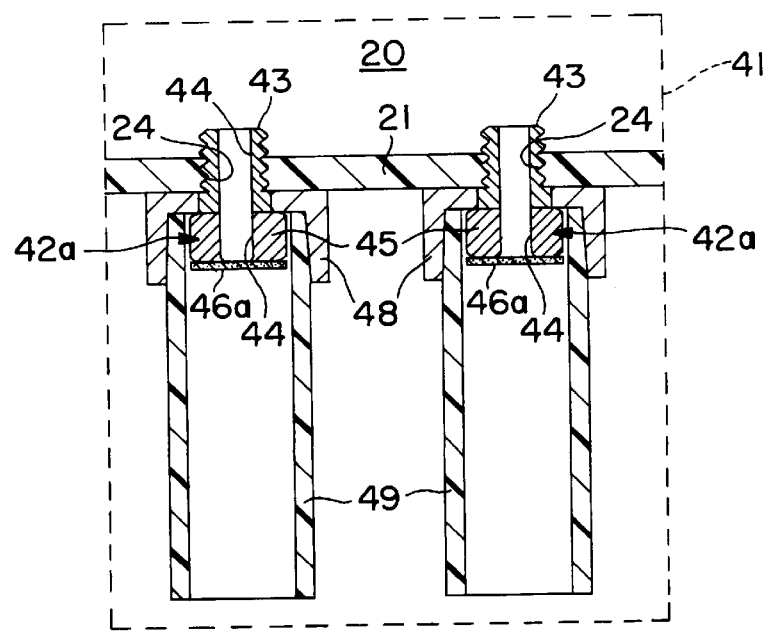
FIG. 4 shows in cross-sectional view an enlarged detail portion 41 of alternative structures in a second preferred embodiment of this invention.

Alternative structures pertaining to filters and the mounting of tubes 49 to the wand 10 is illustrated in FIG. 4. The filter assembly 42a has the same structure as does filter assembly 42 in FIG. 1, except the filter portion 46a employs a simple disc of porous material that is mounted by fusing or bonding the perimeter thereof to the hex portion 45.

The larger filter surface area of filter portion 46 is preferred for its greater air stream capability that permits quantizing and holding larger maximum quantities of growers' particles, but this invention includes the use of filters of any shape.

Since growers' particles will often contain some fine dust, it will be desirable to protect the vacuum pump by placing a dust filter (not shown) in the intake line of the pump (not shown).

A quantizer-dispenser wand 60 shown in FIG. 5 has an elongated pipe with a proximal handle portion 60a and a distal portion 60b. The proximal end of portion 60a is terminated by a vacuum hose connector 63, and the distal end of portion 60b is terminated by a quantizer composed of a filter assembly 42 to which is fitted a quantizing tube 49, just as is used in the wand of FIG. 1 and illustrated in the enlarged detail of FIG. 2. The wand of FIG. 5 may be held by the handle portion 60a, and using the thumb of the hand holding the handle 60a can close the hole 64 to create the vacuum in the hollow of the wand and open the hole 64 to release the vacuum. This wand is especially intended for home growers who expect to dispense materials into relatively few plug trays or pots.

Such a wand may also be useful to commercial growers, especially when modified for incorporation into automatic machinery for dispensing growers' materials into plug trays and/or pots. Such modification may entail for example, eliminating the thumb hole 64, and drastically shortening or eliminating the handle portion 60a, and shortening the distal portion 60b; the shortened wand could then be mounted to a robot for moving the quantizer-dispenser back and forth between a reservoir of growers' material particles and a plurality of trays and or pots, while automatically initiating and releasing the vacuum. Of course the wand 10 of FIG. 1, with multiple filter assemblies 42 and associated quantizing tubes 49, might be combined in an automatic machine requiring little modification of the wand beyond shortening the proximal handle portion. Furthermore, such multiple-filter-assembly wands may be ganged together for simultaneous dispensing of growers materials.

In FIG. 6 is shown a part of the enlarged detail portion (FIG. 2) of the wand of FIG. 1, wherein that part is combined with a particles entry union 67, a check valve 69, a particles feed hose 71 and a reservoir 72 containing particles 52. The check valve 69 includes an upper funnel part 69a mounted to a cylindrical lower cage part 69b, and a free floating metal ball 70 in the cage part 69b. The check valve 69 is press fitted with the cylindrical entry union 72 below, and is press fitted with the distal end of the quantizing tube 49.

The entry union 72 has a threaded hole in one side thereof into which a hose connector 74 is screwed. A growers' materials particles reservoir 72 is positioned above the entry union 67 and the two ends of a flexible feed hose 71 are pressed respectively onto the entry-union-hose connector 74 and a hose connector 76 that is a part of and extends from the bottom of the particles reservoir 72.

The apparatus shown assembled in FIG. 6 operates as follows. When there exists no vacuum in the hollow of the wand pipe 20, the check-valve ball 70 rests as shown on the four inward-directed protrusions 57 of the cage part 69*b*; the tube 49, entry union 67 and upper valve part 68*a* are empty; and there is no flow of the particles 52 from the reservoir 72 into the entry union 67.

When a vacuum is created in the hollow of the wand pipe 20, the check-valve ball 70 pops up against the bottom funnel end of valve part 69*a* (as shown in FIG. 6 by a dashed circle) and closes off the space above it within quantizing tube 49, entry union 67 and valve part 69*a*; meanwhile particles begin to flow through tube 71 and fill that quantizing space within quantizing tube 49, entry union 67 and valve part 69*a*.

Now when the vacuum within the wand pipe 20 is released, the check valve falls to its lower position, allowing the particles having filled the quantizing space to fall through the check-valve by the ball 70 between the four protrusions 75 into whatever plug tray or pot (not shown) may have been located below it. Without the vacuum, no air streams through the feed pipe and the particles therein do not flow.

If to the distal ends of each of the remaining tubes 49 of wand 10 there are also added an entry union 67 and check valve 69, it will now be possible to automate the simultaneous quantizing and dispensing of growers' material particles into a row of plug trays, by providing feeder hoses from the particles reservoir 72 to each of the additional entry unions 67. This may be accomplished by providing a junction feed box (not shown) having hose connectors connected by hose to each of the entry unions 67, and having an inlet hose connector connected by a hose to the hose connector 76 of reservoir 72.

The above noted reluctance of the particles to flow in feed hose 71 when there is no vacuum in the hollow of wand pipe 20, is attributed to the fact that growers' material particles, especially fertilizers and insecticides, have rough surfaces that create resistance to movement between adjacent particles. When this starting friction is overcome by forcing a stream of air through the particles, they flow freely by the combined forces of air flow and gravity.

An alternative structure to that shown in FIG. 6, would eliminate the entry union 67 and instead provide the quantizing tube 49 with a hose connector in a side thereof to which a feeder hose would then be more directly connected. Also the check valve may be permanently connected to and made an integral part of the tube 49.

A less expensive substitute for the conventional check valve 69 shown in FIG. 6, is a flexible tube 80 that is illustrated in FIGS. 8 and 9. In FIG. 6 there is shown a portion of the wand 10 that includes only one port 24 and one filter assembly 42; the quantizing tube 49 has been replaced by a quantizing tube 79 of greater wall thickness having a threaded side hole into which a hose connector 78 is screwed for connection to a growers' material particles feed hose (not shown. Thus this construction is a lower cost alternative to the quantizer-dispenser of FIG. 6.

The flexible-tube check valve 80 may be a tube made of a commercial un-cured polymer intended for slipping over a part to which it will be bonded by applying heat; to shrink the uncured tube material. Other and non-heat-shrinkable materials may be used such a NYLON for the check valve tube 80. Means for attaching tube 80 made of such other materials to the quantizing tube 79 include press fitting, clamping and glue bonding.

In operation the quantizer-dispenser of FIG. 8, the wand pipe 20 is rotated a few degrees with respect to a fixed surface such as a table top 81 and moved toward that surface to bend the flexible tube 80 to close it as shown in FIG. 9.

A vacuum is created in the wand pipe 20 causing the quantizing tube 79 to fill and hold with growers' particles 52 in the quantizing tube 79 and a small upper portion of flexible check-valve tube 80. The wand is moved to a position with the distal end of the check-valve tube 80 over a pot 82 and the vacuum is released to drop and dispense the held particles into the pot 82.

We claim:

1. A quantizer and dispenser of growers' material particles comprising:
   a) a hollow member having an inlet port and an outlet connector;
   b) an air filter covering said inlet port; and
   c) a quantizing tube having a proximal end thereof sealed to said hollow member at the periphery of said port, the distal end of said tube being open;
      so that when said distal quantizing tube end is held in a bed of particles, and a vacuum is created in the hollow of said hollow member that causes air to be withdrawn from said tube through said outlet connector, said quantizing tube fills with and holds the particles in said quantizing tube until said quantizer-dispenser is moved with said quantizing tube distal end registered over a plug tray and a subsequent release of the vacuum dispenses the held and predetermined quantity of particles into said tray.

2. The quantizer and dispenser of claim 1 additionally comprising:

a) a cylindrical shaped entry union having one end connected to said distal end of said quantizing tube, and having a hose connector in one side thereof; and b) a check valve having an inlet end connected to the other end of said entry union, and having a dispensing end;

so that when a reservoir of growers' material particles is elevated above and connected by a feed hose to said entry-union hose connector, the creation of a vacuum in said hollow member causes said check valve to close and produces a stream of air through said reservoir of particles and through said feed hose and tube leading to the filling of said tube and entry union with particles and the holding there of the particles until the vacuum is released at which time said check valve opens and the held particles drop out of said tube and entry union through said check valve into a container that may be positioned beneath said check-valve dispensing end.

3. The quantizer and dispenser of claim 1 wherein said quantizing tube has a hose connector in one side thereof, said quantizer and dispenser additionally comprising:

a) a check-valve tube comprised of a flexible tube having one end connected to said distal end of said quantizing tube, and having a dispensing end;

so that when a reservoir of growers' material particles is elevated above and connected by a feed hose to said hose connector, and said quantizer-dispenser is moved to bend shut said check-valve tube against a fixed surface, the creation of a vacuum in said hollow member produces a stream of air through said reservoir of particles and through said feed hose and quantizing tube leading to the filling of said quantizing tube with particles and leading to the holding there of the particles until the quantizer-dispenser is again moved with the dispensing end of said check-valve tube over a container, the release of the vacuum causing the held particles to drop out of said quantizing tube and said check valve into the container.

4. A quantizer and dispenser of growers' material particles comprising:

a) a wand in the form of an elongated hollow member having a wall and having a plurality of ports in said wall of said elongated hollow member;

b) a plurality of filters, one of said filters covering each of said ports respectively in said elongated hollow-wand member; and c) a plurality of quantizing tubes having the proximal ends thereof sealed respectively to said wand at the periphery of said ports, the distal ends of said quantizing tubes being open;

so that when said distal ends are held in a bed of particles, and a vacuum is created in the hollow of said wand, each of said quantizing tubes fills with and continues to hold the particles until said distal quantizing tube ends are registered over a series of plug trays, respectively, and a subsequent release of the vacuum simultaneously dispenses the held and predetermined quantities of particles from said tubes into the trays.

5. The particles quantizer and dispenser of claim 4 wherein each of said filters is composed of a solid material in which a plurality of holes of about the same size are formed to filter and hold growers' particles from being sucked into the hollow of said wand when a vacuum is effected in said wand.

6. The particles quantizer and dispenser of claim 4 wherein each of said filters is composed of a porous sintered metal having open pores extending from an inside face adjacent the hollow of said wand to an outside face open to the hollow of the corresponding of said quantizing tubes.

7. The particles quantizer and dispenser of claim 4 wherein each of said filters is composed of a porous sintered metal that extends into the corresponding of said quantizing tubes.

8. The particles quantizer and dispenser of claim 4 wherein each of said filters is composed of a porous sintered metal having a tapered cone portion extending into the corresponding of said quantizing tubes.

9. The particles quantizer and dispenser of claim 4 wherein said quantizing tubes are of the same length and said filters are of the same size, so that the amounts of said particles that fill and are held in each of said quantizing tubes while the vacuum is present are essentially the same.

10. The particles quantizer and dispenser of claim 4 wherein said ports are formed uniformly apart in a straight row in said wall of said hollow-wand member.

11. The particles quantizer and dispenser of claim 10 wherein said hollow-wand member includes an axially running portion in the form of a pipe that contains said ports, the straight row formed by said ports lie parallel with the axis of said elongated hollow-wand member portion.

12. The particles quantizer and dispenser of claim 4 comprising a means for said sealing said proximal quantizing tube ends having a plurality of cups each having a bottom portion with a hole therein, the hole being registered with one of said ports, each said cup bottom portion being mounted and sealed to said periphery of one of said each ports, said cups adapted for having the proximal ends of said quantizing tubes press fitted into said cups to effect a seal with said wand at said periphery of said each port.

13. A kit for making a quantizer and dispenser of growers' materials particles comprising:

a) a wand in the form of an axially running elongated hollow member having a solid tubular wall and having a plurality of ports in said wall of said elongated hollow member;

b) a plurality of filters that may be fitted in each of the ports in said elongated hollow-wand member;

c) a plurality of quantizing tubes, each of said quantizing tubes having an open distal end and a proximal end; and d) tube-sealing receptor means capable of receiving and sealing the proximal ends of said quantizing tubes to said wand at the periphery of each of said ports to create a passageway for air to freely move from the cavity of each said quantizing tubes through said corresponding ports into the hollow of said wand.

14. The kit of claim 13 wherein said tube-sealing receptor means is comprised of a plurality of cups each having a bottom with a hole registered with one of said ports, each said cup bottoms being mounted and sealed to said periphery of said each port.

* * * * *